United States Patent
Tsai (10) Patent No.: US 11,036,119 B2
(45) Date of Patent: Jun. 15, 2021

(54) PROJECTION DEVICE (71) Applicant: Delta Electronics, Inc., Taoyuan (TW)

(72) Inventor: Yi-Ting Tsai, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/749,390

(22) Filed: Jan. 22, 2020

(65) Prior Publication Data

US 2021/0124245 A1 Apr. 29, 2021

(30) Foreign Application Priority Data

Oct. 25, 2019 (CN) .......................... 201911021401.4

(51) Int. Cl.
G03B 21/16 (2006.01)
G03B 21/20 (2006.01)
G02B 26/08 (2006.01)
H04N 9/31 (2006.01)

(52) U.S. Cl.
CPC ......... G03B 21/16 (2013.01); G02B 26/0833 (2013.01); G03B 21/2033 (2013.01); G03B 21/2066 (2013.01); H04N 9/3108 (2013.01)

(58) Field of Classification Search
CPC ...... G03B 21/00–64; H04N 9/31–3197; G02B 26/00–129
See application file for complete search history.

(56) References Cited

U.S. PATENT DOCUMENTS

| 6,254,238 | B1 | 7/2001 | Takamatsu |
| 6,844,993 | B2 | 1/2005 | Fujimori et al. |
| 7,296,898 | B2 | 11/2007 | Wu |
| 2005/0237620 | A1* | 10/2005 | Hsu .................. G02B 26/0833 359/618 |

(Continued)

FOREIGN PATENT DOCUMENTS

| CN | 2932436 Y | 8/2007 |
| CN | 104111577 A | 10/2014 |

(Continued)

Primary Examiner — Michelle M Iacoletti
Assistant Examiner — Christopher A Lamb, II
(74) Attorney, Agent, or Firm — Kirton McConkie; Evan R. Witt (57) ABSTRACT A projection device includes a prism set, a digital micromirror device, a reflective component and a heat dissipation module. The prism set includes a light-incident side and a mirror-corresponding side opposite to each other, and includes a first light-emitting side and a second light-emitting side adjacent to each other. The digital micromirror device spatially corresponds to the mirror-corresponding side. An incident light is transmitted through the light-incident side to irradiate the digital micro-mirror device. When the digital micro-mirror device generates an on-state light, the on-state light is outputted through the first light-emitting side. When the digital micro-mirror device generates an off-state light, the off-state light is transmitted toward the reflective component and outputted through the second light-emitting side. The heat dissipation module spatially corresponding to the second light-emitting side is configured to absorb and convert the off-state light for heat dissipation.

24 Claims, 9 Drawing Sheets (56) References Cited

U.S. PATENT DOCUMENTS

| | | | | |
|---|---|---|---|---|
| 2015/0205035 A1* | 7/2015 | Border | ............... | G02B 26/0833 362/19 |
| 2016/0049008 A1* | 2/2016 | Haddick | ................. | G06F 1/163 345/633 |
| 2016/0241819 A1* | 8/2016 | Chien | .................... | H04N 9/315 |
| 2016/0299417 A1 | 10/2016 | Lambot | | |
| 2016/0349604 A1* | 12/2016 | Okuno | .................. | G03B 21/16 |
| 2017/0261846 A1 | 9/2017 | Maes | | |
| 2017/0285453 A1* | 10/2017 | Morant | .............. | G02B 27/0101 |

FOREIGN PATENT DOCUMENTS

| | | |
|---|---|---|
| CN | 209248236 U | 8/2019 |
| EP | 2198344 B1 | 8/2012 |
| TW | I306983 B | 3/2009 |
| TW | 201013299 A | 4/2010 |
| TW | I447509 B | 8/2014 |
| TW | 201816501 A | 5/2018 |
| TW | I631409 B | 8/2018 |
| WO | 2018115007 A2 | 6/2018 |

* cited by examiner

PROJECTION DEVICE

FIELD OF THE INVENTION

The present disclosure relates to a projection device, and more particularly to a projection device having a heat dissipation module for an off-state light.

BACKGROUND OF THE INVENTION

In response to market demand, the current projection device tends to pursue an increase in brightness continuously. It means that power supplied to the projection device is increased and accompanied by heat generation. However, when the projection device is actually used, it does not continuously provide an on-state light to produce a projected bright picture. When the projection device is operated to provide an off-state light, the projected bright picture disappears to present a dark picture, and most of the light energy of the projection device is remained inside the optical mechanism. Since the optical mechanism of the conventional projection device adopts a closed casing design, the heat energy is not easy to be dissipated from the inside. Consequently, the accumulated heat may cause the temperature of the internal critical optical components to be too high, thereby damaging or malfunctioning.

An optical mechanism of a conventional one-chip laser projector is taken as an example. When the optical mechanism is controlled to provide the off-state light, a barrier sheet is utilized to block between the lens and the prism, so as to prevent the projection light source from directly irradiating the edge of the lens, causing the lens to be heated up and be damaged. Due to the limitation of occupied space relative to other components, the thickness of the barrier sheet is thin, so that the thermal resistance for heat diffusion is high, and the heat dissipation effect is not good. Moreover, due to the limitation of focal length between the lens and the prism, it is not easy to provide a heat dissipation module to connect to the barrier sheet for heat dissipation. Therefore, when the conventional optical mechanism is operated to provide the off-state light, an effective heat dissipation module cannot be provided. Consequently, the heat energy is accumulated in the barrier sheet and cannot be dissipated in time. As the temperature of the barrier sheet is increased, the optical components inside the optical mechanism, the lens or the prism adjacent to the barrier sheet are susceptible to increase the temperature, and it results to increase the risk of malfunction and damage.

Therefore, there is a need of providing a projection device having a heat dissipation module for an off-state light. It is beneficial to achieve the heat dissipation effect in the closed optical mechanism and decrease the temperature of the internal critical optical components. The luminous efficiency and the reliability of the projection device are enhanced, and the above issues encountered by the prior arts is addressed.

SUMMARY OF THE INVENTION

The present disclosure is to provide a projection device having a heat dissipation module for an off-state light. By disposing at least one reflective component and a heat dissipation module spatially corresponding to a first light-emitting side and a second light-emitting side of the prism set, respectively, it solves the problem that it is difficult to directly dissipate the energy of the off-state light when the available space is limited. It is beneficial to achieve the heat dissipation effect in the closed optical mechanism and decrease the temperature of the internal critical optical components. Thus, the luminous efficiency and the reliability of the projection device are enhanced.

Also with the arrangement of the reflective component, the off-state light is transmitted to a space conducive to heat dissipation and a heat dissipation module is further utilized for heat dissipation. An anti-reflection film is formed on a second light-emitting side where the off-state light passes through, so as to increase the transmittance of the off-state light passing thought the second light-emitting side and reduce the stagnation of the off-state light in the prism set. On the other hand, a receiving portion of the heat dissipation module is disposed adjacent to the second light-emitting side of the prism set and accommodated within the closed optical mechanism for absorbing the off-state light and converting the off-state light into heat energy. The heat energy converted from the off-state light is further transferred to an external heat dissipation portion by a thermal conducting portion for heat dissipation. The receiving portion is located at the inside of the optical mechanism and includes a geometric surface that is conducive to the retention of the off-state light for absorption. Moreover, the geometric surface is blackened and roughened to increase the absorption of the off-state light. The light energy of the off-state light is absorbed and converted into the heat energy by the receiving portion efficiently. The heat energy is transferred through the thermal conducting portion to the heat dissipation portion located outside the optical mechanism for heat dissipation. The problem of disposing the heat dissipation module is solved. Moreover, it is beneficial to achieve the heat dissipation effect to release the energy of the off-state light inside the optical mechanism and decrease the temperature of the internal critical optical components. Thus, the luminous efficiency and the reliability of the projection device are enhanced.

In accordance with an aspect of the present disclosure, a projection device is provided and includes a prism set, a digital micro-mirror device, a lens, a reflective component and a heat dissipation module. The prism set includes a light-incident side, a mirror-corresponding side, a first light-emitting side and a second light-emitting side. The mirror-corresponding side and the first light-emitting side are opposite to each other. The first light-emitting side and the second light-emitting side are disposed adjacent to each other. An anti-reflection film is disposed on the second light-emitting side. The digital micro-mirror device spatially corresponds to the mirror-corresponding side of the prism set. When an incident light passes through the light-incident side of the prism set and is transmitted to the digital micro-mirror device, the digital micro-mirror device is configured to generate one of an on-state light and an off-state light selectively. The lens spatially corresponds to the first light-emitting side of the prism set. When the digital micro-mirror device generates the on-state light, the on-state light passes through the first light-emitting side and is transmitted to the lens. The reflective component is disposed between the prism set and the lens and at least partially overlaps the first light-emitting side in view of a direction from the prism set toward the lens. When the digital micro-mirror device generates the off-state light, the off-state light is transmitted to the reflective component, the reflective component reflects the off-state light, and the off-state light passes through the anti-reflection film on the second light-emitting side. The heat dissipation module spatially corresponds to the second light-emitting side of the prism set. The off-state light passing through the anti-reflection film on the second light-emitting side is absorbed by the heat dissipation module and converted into heat energy for heat dissipation.

In an embodiment, the heat dissipation module includes a receiving portion disposed adjacent to the second light-emitting side of the prism set and configured to absorb the off-state light passing through the anti-reflection film on the second light-emitting side.

In an embodiment, the receiving portion includes a geometric surface. The geometric surface is blackened and roughened to facilitate retention of the off-state light and increase absorption of the off-state light.

In an embodiment, the projection device further includes a casing having an accommodation space. The prism set and the receiving portion of the heat dissipation module are accommodated within the accommodation space, the incident light faces the light-incident side, the digital micro-mirror device faces the mirror-corresponding side, and the lens faces the first light-emitting side.

In an embodiment, the heat dissipation module further includes a thermal conducting portion and a heat dissipation portion. The thermal conducting portion is connected between the receiving portion and the heat dissipation portion, and the heat dissipation portion is disposed outside the casing.

In an embodiment, the thermal conductive portion is one of a heat pipe and a copper pipe, and the heat dissipation portion is one of a heat sink and a semiconductor cooler.

In an embodiment, an angle is formed between the first light-emitting side and the second light-emitting side. The angle is less than 90 degrees.

In an embodiment, the prism set further includes an auxiliary reflective side. The first light-emitting side and the auxiliary reflective side face each other, and the second light-emitting side is connected between the first light-emitting side and the auxiliary reflective side.

In an embodiment, an angle is formed between the second light-emitting side and the auxiliary reflective side. The angle is less than 90 degrees.

In an embodiment, the prism set includes at least one first prism and at least one second prism. The at least one first prism and the at least one second prism have an interface, which is configured to reflect the incident light toward the digital micro-mirror device and allows the on-state light and the off-state light to pass therethrough. The light-incident side and the mirror-corresponding side are disposed on the at least one first prism, and the first light-emitting side and the second light-emitting side are disposed on the at least one second prism.

In an embodiment, the reflective component is disposed adjacent to a joint point of the first light-emitting side and the second light-emitting side.

In an embodiment, the reflective component is a reflection film disposed on the first light-emitting side, and the reflection film at least partially covers the first light-emitting side.

In an embodiment, the reflective component is a metallic sheet has a reflective surface. The reflective surface at least partially overlaps the first light-emitting side in view of the direction from the prism set toward the lens.

In an embodiment, the projection device is a one-chip laser projector.

In accordance with another aspect of the present disclosure, a projection device is provided and includes a prism set, a digital micro-mirror device, a reflective component and a heat dissipation module. The prism set includes a light-incident side, a mirror-corresponding side, a first light-emitting side and a second light-emitting side. The mirror-corresponding side and the first light-emitting side are opposite to each other. The first light-emitting side and the second light-emitting side are disposed adjacent to each other. The digital micro-mirror device spatially corresponds to the mirror-corresponding side of the prism set. When an incident light passes through the light-incident side of the prism set and is transmitted to the digital micro-mirror device, the digital micro-mirror device is configured to generate one of an on-state light and an off-state light selectively. When the digital micro-mirror device generates the on-state light, the on-state light passes through the first light-emitting side. The reflective component spatially corresponds to the first light-emitting side of the prism set and at least partially overlaps the first light-emitting side in view of a direction from the prism set toward the lens. When the digital micro-mirror device generates the off-state light, the off-state light is transmitted to the reflective component, the reflective component reflects the off-state light, and the off-state light passes through the second light-emitting side. The heat dissipation module spatially corresponds to the second light-emitting side of the prism set. The off-state light passing through the second light-emitting side is absorbed by the heat dissipation module and converted into heat energy for heat dissipation.

In an embodiment, the projection device further includes a lens spatially corresponding to the first light-emitting side of the prism set. When the digital micro-mirror device generates the on-state light, the on-state light passes through the first light-emitting side and is transmitted to the lens.

In an embodiment, an anti-reflection film is formed on the second light-emitting side.

In an embodiment, the heat dissipation module includes a receiving portion, a thermal conducting portion and a heat dissipation portion. The receiving portion is disposed adjacent to the second light-emitting side of the prism set and configured to absorb the off-state light passing through the anti-reflection film on the second light-emitting side. The thermal conducting portion is connected between the receiving portion and the heat dissipation portion.

In an embodiment, the receiving portion includes a geometric surface. The geometric surface is blackened and roughened to facilitate retention of the off-state light and increase absorption of the off-state light.

In an embodiment, the projection device further includes a casing having an accommodation space. The prism set and the receiving portion of the heat dissipation module are accommodated within the accommodation space, the incident light faces the light-incident side, the digital micro-mirror device faces the mirror-corresponding side, the lens faces the first light-emitting side, and the heat dissipation portion is disposed outside the casing.

In an embodiment, an angle is formed between the first light-emitting side and the second light-emitting side. The angle is less than 90 degrees.

In an embodiment, the prism set further includes an auxiliary reflective side. The first light-emitting side and the auxiliary reflective side face each other, and the second light-emitting side is connected between the first light-emitting side and the auxiliary reflective side.

In an embodiment, an angle is formed between the second light-emitting side and the auxiliary reflective side. The angle is less than 90 degrees.

In an embodiment, the prism set includes at least one first prism and at least one second prism. The at least one first prism and the at least one second prism have an interface, which is configured to reflect the incident light toward the digital micro-mirror device and allows the on-state light and the off-state light to pass therethrough. The light-incident side and the mirror-corresponding side are disposed on the at least one first prism, and the first light-emitting side and the second light-emitting side are disposed on the at least one second prism.

In an embodiment, the reflective component is a reflection film disposed on the first light-emitting side, and the anti-reflection film at least partially covers the first light-emitting side.

In an embodiment, the reflective component is a metallic sheet has a reflective surface. The reflective surface at least partially overlaps the first light-emitting side in view of the direction from the prism set toward the lens.

In an embodiment, the projection device is a one-chip laser projector.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
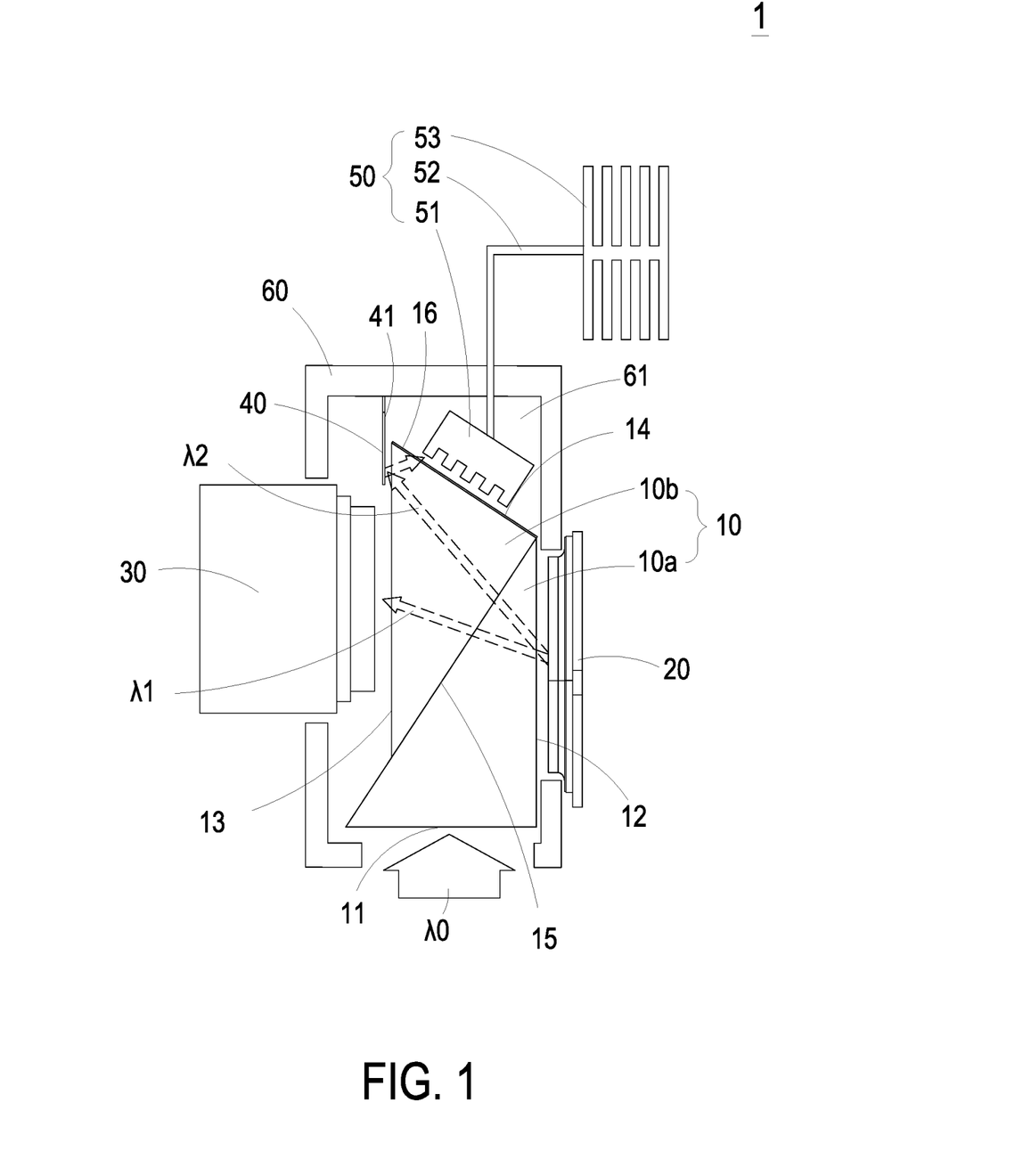
FIG. 1 is a structural view illustrating a projection device according to a first embodiment of the present disclosure.
Figure 2:
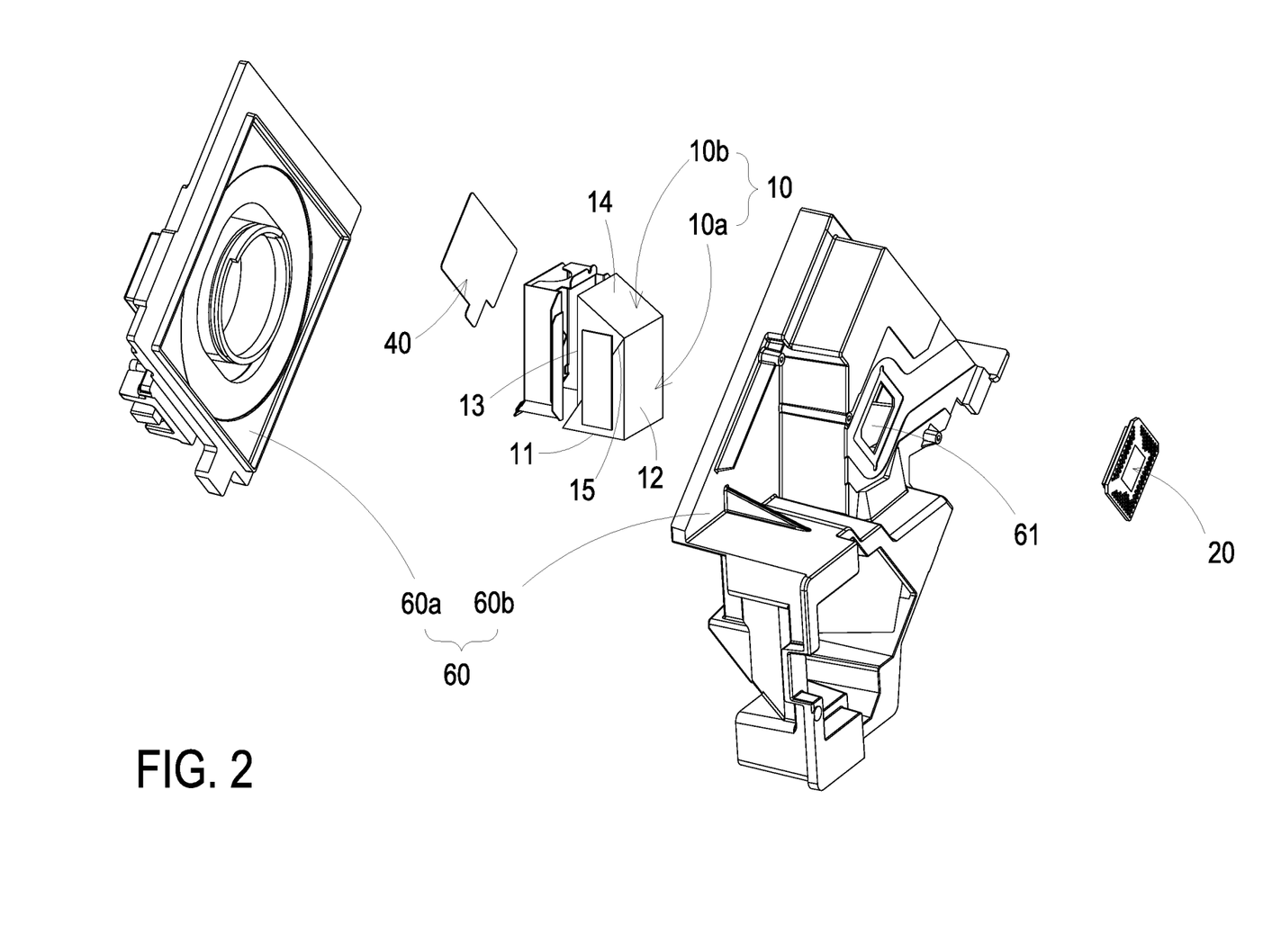
FIG. 2 is a partial structural view illustrating the projection device according to the first embodiment of the present disclosure.
Figure 3:
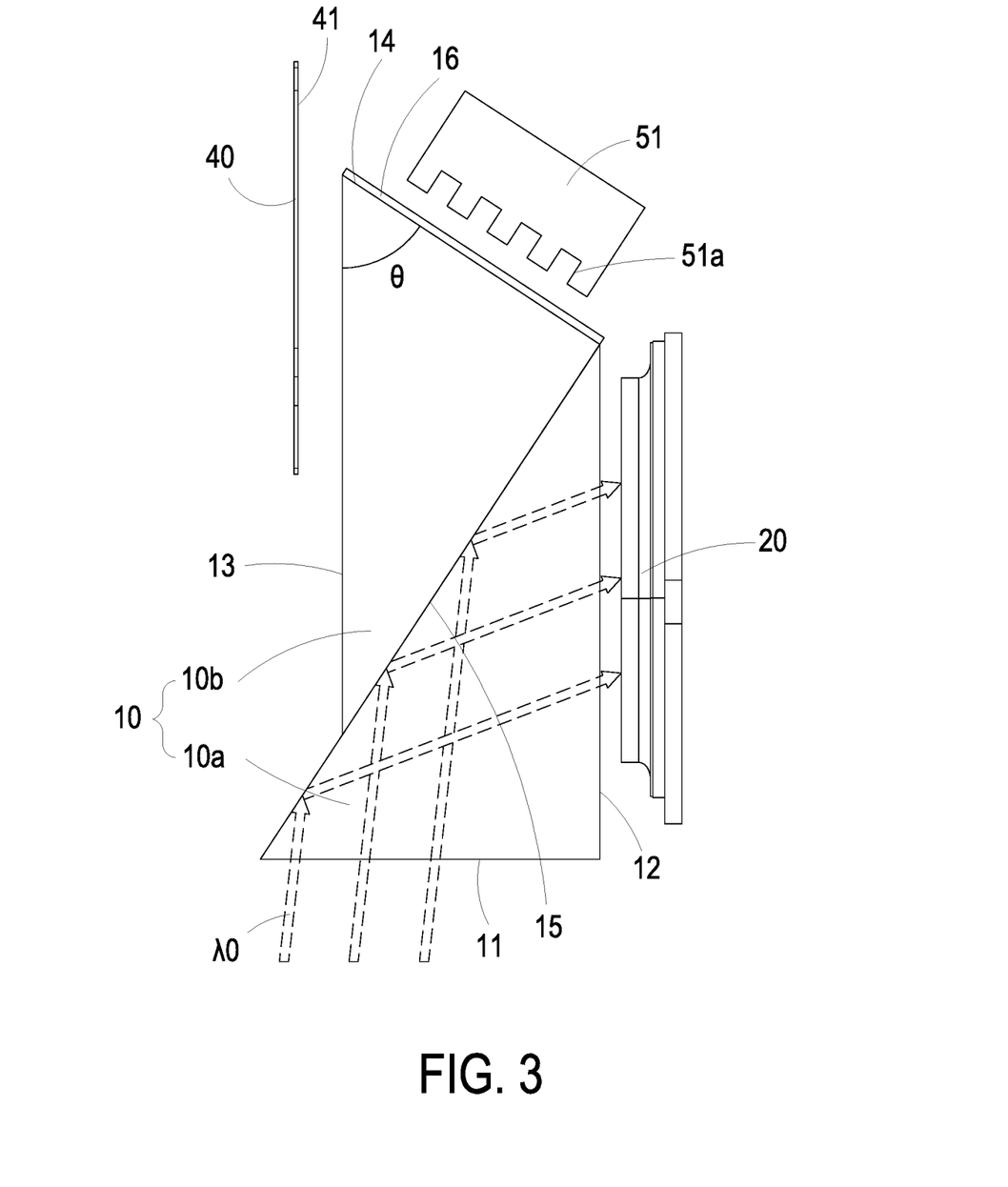
FIG. 3 is a light path diagram of an incident light of the projection device according to the first embodiment of the present disclosure.
Figure 4:
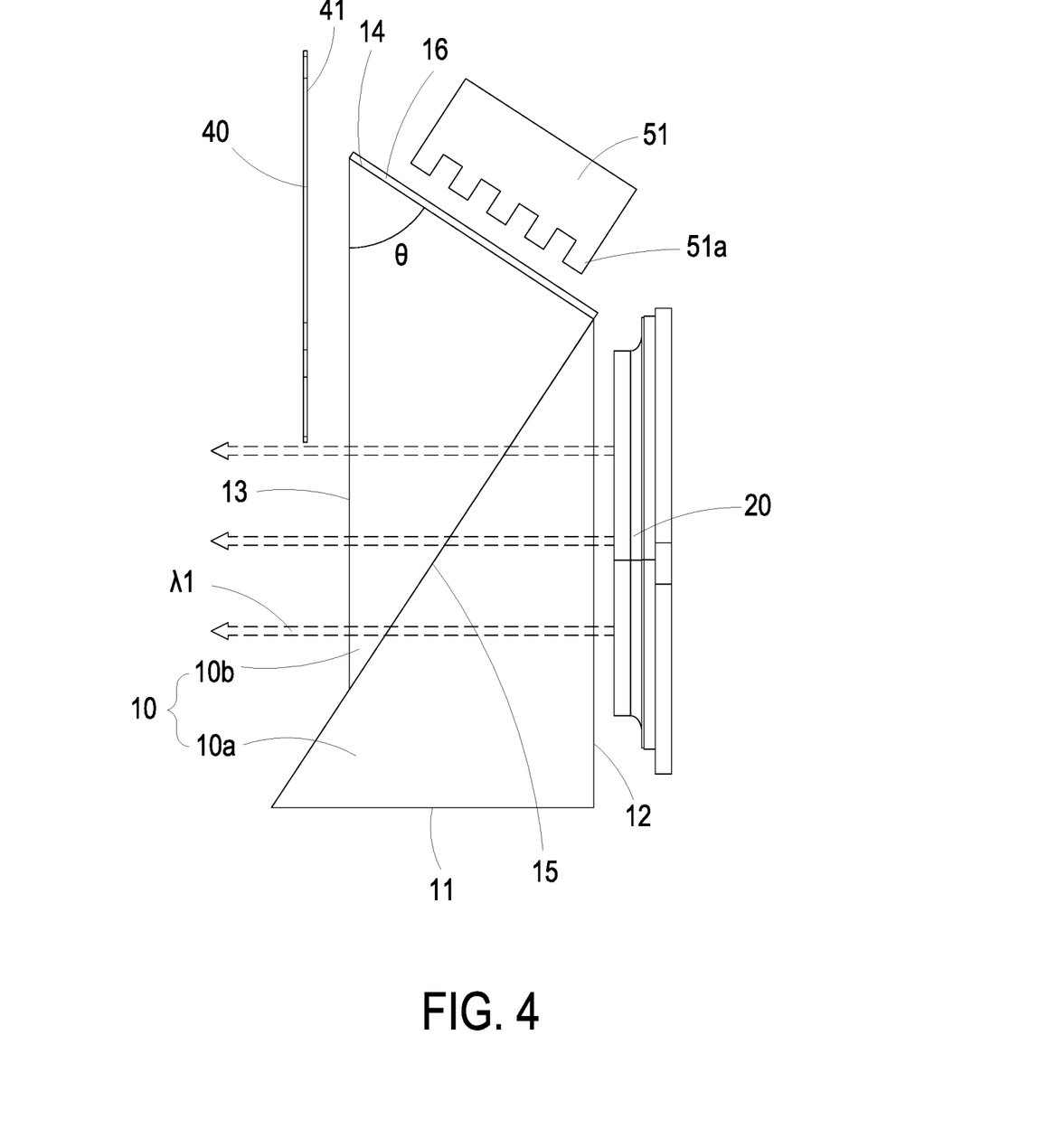
FIG. 4 is a light path diagram of an on-state light of the projection device according to the first embodiment of the present disclosure.
Figure 5:
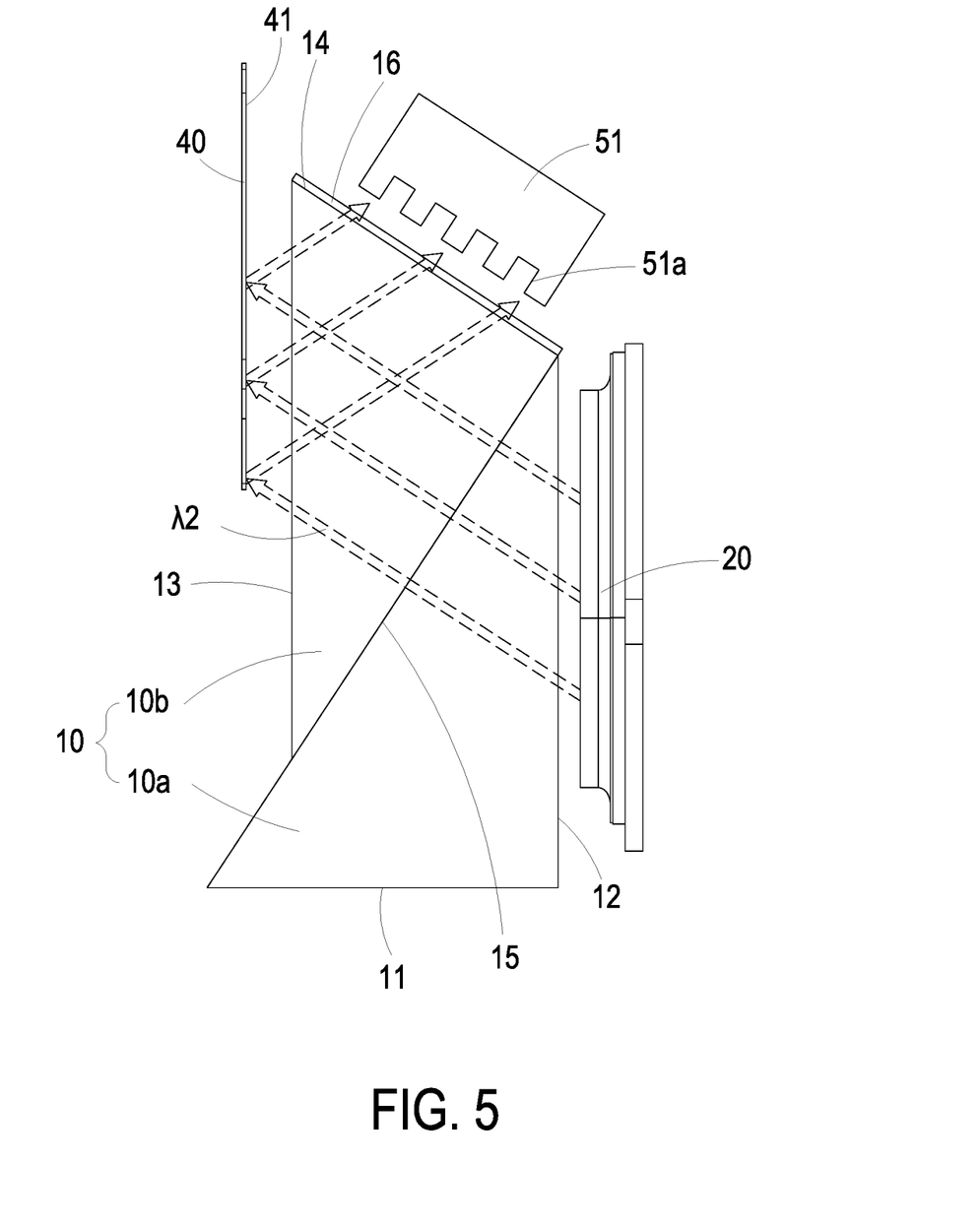
FIG. 5 is a light path diagram of an off-state light of the projection device according to the first embodiment of the present disclosure.

FIG. 1 is a structural view illustrating a projection device according to a first embodiment of the present disclosure. FIG. 2 is a partial structural view illustrating the projection device according to the first embodiment of the present disclosure. FIG. 3 is a light path diagram of an incident light of the projection device according to the first embodiment of the present disclosure. FIG. 4 is a light path diagram of an on-state light of the projection device according to the first embodiment of the present disclosure. FIG. 5 is a light path diagram of an off-state light of the projection device according to the first embodiment of the present disclosure. In the embodiment, the projection device 1 is for example but not limited to a one-chip laser projector. The projection device 1 includes a prism set 10, a digital micro-mirror device (DMD) 20, a lens 30, a reflective component 40, a heat dissipation module 50 and a casing 60. Preferably but not exclusively, the casing 60 is formed by assembling a front cover 60a and a rear cover 60b and has an accommodation space 61. The prism set 10 is accommodated within the accommodation space 61 of the casing 60. Moreover, the prism set 10 includes a light-incident side 11, a mirror-corresponding side 12, a first light-emitting side 13 and a second light-emitting side 14. In the embodiment, the mirror-corresponding side 12 and the first light-emitting side 13 are opposite to each other. The first light-emitting side 13 and the second light-emitting side 14 are disposed adjacent to each other. Preferably but not exclusively, an anti-reflection film 16 is further disposed on the second light-emitting side 14. In addition, when the prism set 10 is accommodated within the accommodation space 61 of the casing 60, an incident light λ0 faces the light-incident side 11, the digital micro-mirror device 20 faces the mirror-corresponding side 12, and the lens 30 faces the first light-emitting side 13. In the embodiment, the digital micro-mirror device 20 spatially corresponds to the mirror-corresponding side 12 of the prism set 10. Firstly, the incident light λ0 passes through the light-incident side 11 of the prism set 10 and is transmitted to the digital micro-mirror device 20, as shown in FIG. 3. Then, the digital micro-mirror device 20 is configured to generate one of an on-state light λ1 (as shown in FIG. 4) and an off-state light λ2 (as shown in FIG. 5) selectively. It should be noted that the digital micro-mirror device 20 includes a plurality of microscopic mirrors (not shown) arranged in an array. Each microscopic mirror is configured to control a pixel in the image to be displayed. The microscopic mirrors are individually controlled by a digital driving signal to rotate at a specific angle rapidly. When the microscopic mirrors receive the digital driving signal correspondingly, the tilt angle of the microscopic mirrors is adjusted, thereby changing the reflective direction of the incident λ0. The microscopic mirror utilized to produce a projected bright picture is presented as "on-state" and the on-state light λ1 is provided as shown in FIG. 4. In the embodiment, the lens 30 spatially corresponds to the first light-emitting side 13 of the prism set 10. When the digital micro-mirror device 20 is configured to generate the on-state light λ1, the on-state light λ1 passes through the first light-emitting side 13 and is transmitted to the lens 30. On the other hand, the microscopic mirror utilized to produce a dark picture is presented as "off-state" and the off-state light λ2 is provided as shown in FIG. 5. In the embodiment, the reflective component 40 is for example but not limited to a metallic sheet, which is disposed between the prism set 10 and the lens 30, and is disposed adjacent to a joint point of the first light-emitting side 13 and the second light-emitting side 14. The reflective component 40 further includes a reflective surface 41. The reflective surface 41 at least partially overlaps the first light-emitting side 13 in view of a direction from the prism set 10 toward the lens 30. When the digital micro-mirror device 20 generates the off-state light λ2, the off-state light λ2 is transmitted to the reflective component 40, the reflective component 40 reflects the off-state light λ2, and the off-state light λ2 passes through the anti-reflection film 16 on the second light-emitting side 14. In the embodiment, the heat dissipation module 50 is connected to the casing 60 and spatially corresponds to the second light-emitting side 14 of the prism set 10. The off-state light λ2 passing through the anti-reflection film 16 on the second light-emitting side 14 is absorbed by the heat dissipation module 50, and the off-state light λ2 is further converted into heat energy for heat dissipation.

In the embodiment, the prism set 10 includes at least one first prism 10a and at least one second prism 10b. The at least one first prism 10a and the at least one second prism 10b have an interface 15, which is configured to reflect the incident light λ0 toward the digital micro-mirror device 20. Moreover, the interface 15 allows the on-state light λ1 to pass therethrough when the digital micro-mirror device 20 is controlled to generate the on-state light λ1, so that the on-state light λ1 is transmitted through the first light-emitting side 13 toward the lens 30. Similarly, the interface 15 allows the off-state light λ2 to pass therethough when the digital micro-mirror device 20 is controlled to generate the off-state light λ2, so that the off-state light λ2 is transmitted toward the reflective component 40 and further transmitted through the second light-emitting side 14 to the heat dissipation module 50. In the embodiment, the light-incident side 11 and the mirror-corresponding side 12 are disposed on the at least one first prism 10a, and the first light-emitting side 13 and the second light-emitting side 14 are disposed on the at least one second prism 10b. Certainly, the present disclosure is not limited thereto. Notably, the anti-reflection film 16 is further formed on the second light-emitting side 14 where the off-state light λ2 passes through, so as to increase the transmittance of the off-state light λ2 passing thought the second light-emitting side 14 and reduce the stagnation of the off-state light λ2 in the prism set 10. Thus, the energy of the off-state light λ2 is absorbed completely by the heat dissipation module 50 and is converted into heat energy for heat dissipation. Certainly, the present disclosure is not limited thereto. In other embodiments, the anti-reflection film 16 is omitted. After passing through the second light-emitting side 14, the off-state light λ2 is absorbed by the heat dissipation module 50. In addition, the numbers and the sizes of the first prism 10a and the second prism 10b, and the assembling method of the prism set 10 are adjustable according to the practical requirements. The present disclosure is not limited thereto and not redundantly described herein.

On the other hand, in the embodiment, the heat dissipation module 50 includes a receiving portion 51, a thermal conducting portion 52 and a heat dissipation portion 53. The receiving portion 51 is accommodated within the accommodation space 61 of the casing 60 and disposed adjacent to the second light-emitting side 14 of the prism set 10 and the anti-reflection film 16. In the embodiment, the heat dissipation module 50 is configured to absorb the off-state light λ2 passing through the anti-reflection film 16 on the second light-emitting side 14, and further convert the energy of the off-state light λ2 into heat energy. In the embodiment, the receiving portion 51 further includes a geometric surface 51a. Preferably but not exclusively, the geometric surface 51a is blackened and roughened to be conducive to the retention of the off-state light λ2 for absorption and increase the absorption of the off-state light λ2. Moreover, in the embodiment, the thermal conducting portion 52 is example but not limited to a heat pipe or a copper pipe, which passes through the casing 60 and is connected between the receiving portion 51 and the heat dissipation portion 53. Preferably but not exclusively, the heat dissipation portion 53 is a heat sink or a semiconductor cooler, disposed outside the casing 60. In the embodiment, the prism set 10 and the receiving portion 51 of the heat dissipation module 50 are accommodated within the accommodation space 61 of the casing 60. The incident light λ0 faces the light-incident side 11. The digital micro-mirror device 20 faces the mirror-corresponding side 12. The lens 30 faces the first light-emitting side 13. Notably, the prism set 10 and the receiving portion 51 of the heat dissipation module 50 are accommodated with in the limited accommodation space 61 of the casing 60. In the embodiment, an angle θ is formed between the first light-emitting side 13 and the second light-emitting side 14 of the prism set 10. Preferably but not exclusively, the angle θ is less than 90 degrees. Therefore, when the prism set 10 is accommodated within the accommodation space 61 of the casing 60, the accommodation space 61 is applicable of accommodating the receiving portion 51 of the heat dissipation module 50 between the casing 60 and the second light-emitting side 14 of the prism set 10. In other words, the projection device 1 of the present disclosure provides the receiving portion 51 of the heat dissipation module 50 disposed adjacent to the second light-emitting side 14 of the prism set 10, it facilitates the receiving portion 51 of the heat dissipation module 50 to absorb the energy of the off-state light λ2 and convert it into heat energy effectively. The heat energy converted from the off-state light λ2 is further transferred through the thermal conducting portion 52 to the heat dissipation portion 53 located outside the casing 60 for heat dissipation. The problem of disposing the heat dissipation module 50 is solved. Moreover, it is beneficial to achieve the heat dissipation effect to release the energy of the off-state light λ2 inside the casing 60 and decrease the temperature of the internal critical optical components. Thus, the luminous efficiency and the reliability of the projection device 1 are enhanced.

Figure 6:
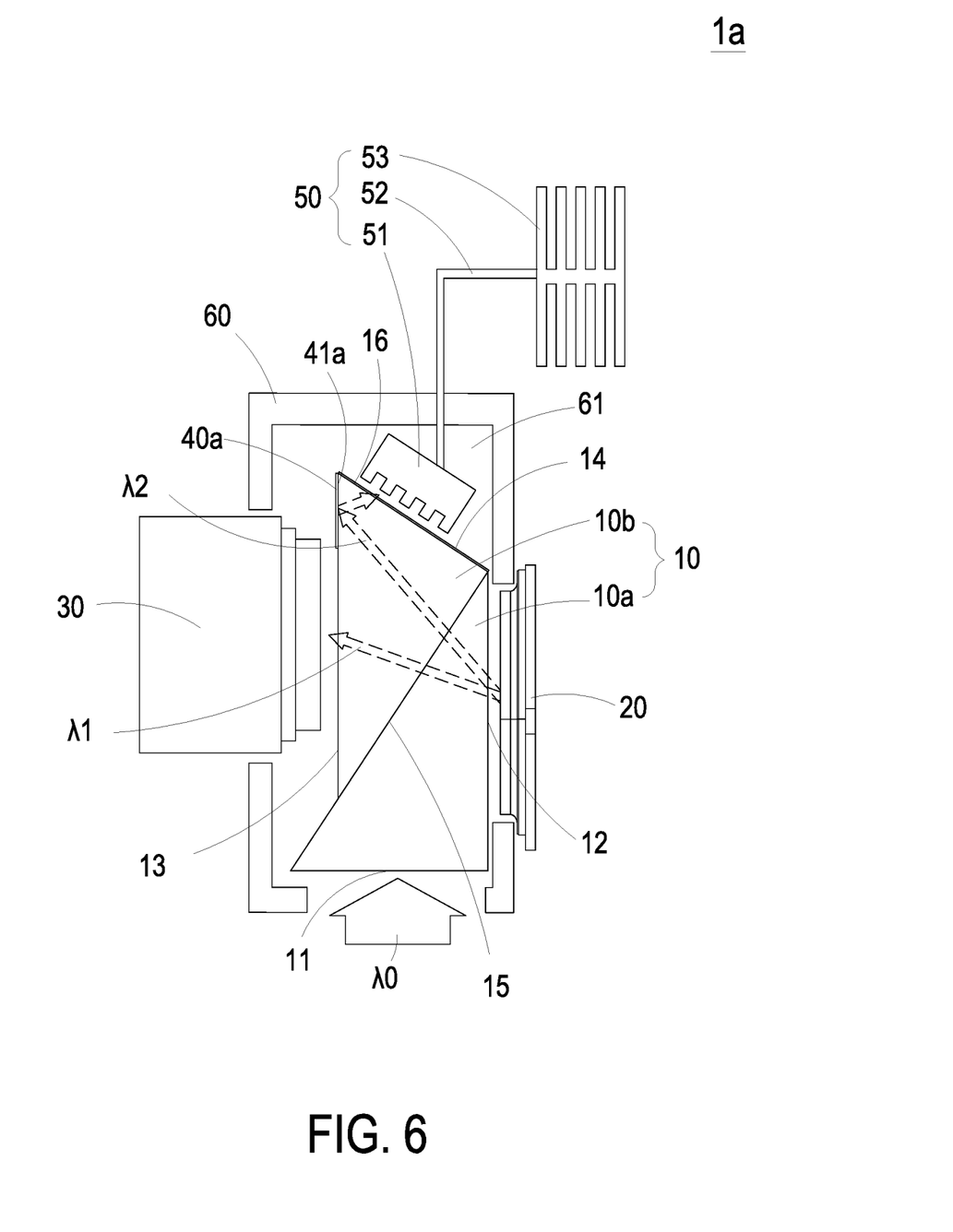
FIG. 6 is a structural view illustrating a projection device according to a second embodiment of the present disclosure.
Figure 7:
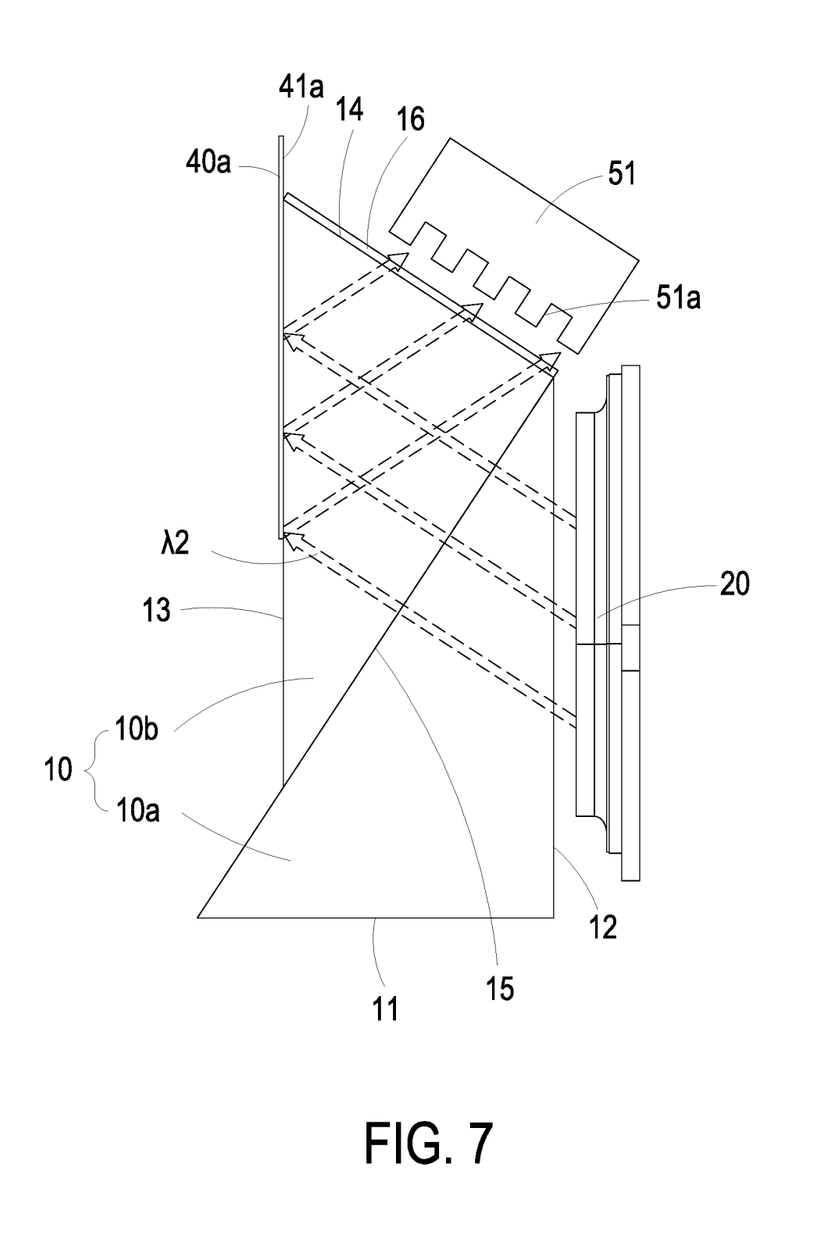
FIG. 7 is a light path diagram of an off-state light of the projection device according to the second embodiment of the present disclosure.

FIG. 6 is a structural view illustrating a projection device according to a second embodiment of the present disclosure. FIG. 7 is a light path diagram of an off-state light of the projection device according to the second embodiment of the present disclosure. In the embodiment, the structures, elements and functions of the projection device 1a are similar to those of the projection device 1 in FIGS. 1 to 5. The elements and features indicated by the numerals similar to those of the first embodiment mean similar elements and features, and are not redundantly described herein. In the embodiment, the reflective component 40a is a reflection film disposed on the first light-emitting side 13. Preferably but not exclusively, the reflection film at least partially covers the first light-emitting side 13. In that, the reflective surface 41a of the reflective component 40a at least partially overlaps the first light-emitting side 13 in view of the direction from the prism set 10 toward the lens 30. Namely, the covered part of the first light-emitting side 13 is served as the reflective surface 41a. When the digital micro-mirror device 20 generates the off-state light λ2, the off-state light λ2 is transmitted to the reflective component 40a, the reflective surface 41a of the reflective component 40a reflects the off-state light λ2, and the off-state light λ2 passes through the anti-reflection film 16 on the second light-emitting side 14. The off-state light λ2 passing through the anti-reflection film 16 on the second light-emitting side 14 is absorbed by the receiving portion 51 of the heat dissipation module 50, which is accommodated within the casing 60, so that the off-state light λ2 is converted into heat energy. After the off-state light λ2 is converted into the heat energy, the heat energy is transferred through the thermal conducting portion 52 to the heat dissipation portion 53 located outside the casing 60 for heat dissipation. By disposing the reflective component 40a and the receiving portion 51 of the heat dissipation module 50 spatially corresponding to the first light-emitting side 13 and the second light-emitting side 14 of the prism set 10, respectively, it solves the problem that it is difficult to directly dissipate the energy of the off-state light λ2 when the available space is limited. It is beneficial to achieve the heat dissipation effect in the closed optical mechanism, such as in the casing 60, and decrease the temperature of the internal critical optical components. Thus, the luminous efficiency and the reliability of the projection device 1a are enhanced. It should be further noted that, by coating the reflection film and the anti-reflection film, the reflective surface 41a and the first light-emitting side 13 are formed on the same side of the prism set 10. The ratio of the reflective surface 41a to the first light-emitting side 13 is adjustable according to the practical requirements. The present disclosure is not limited thereto.

Figure 8:
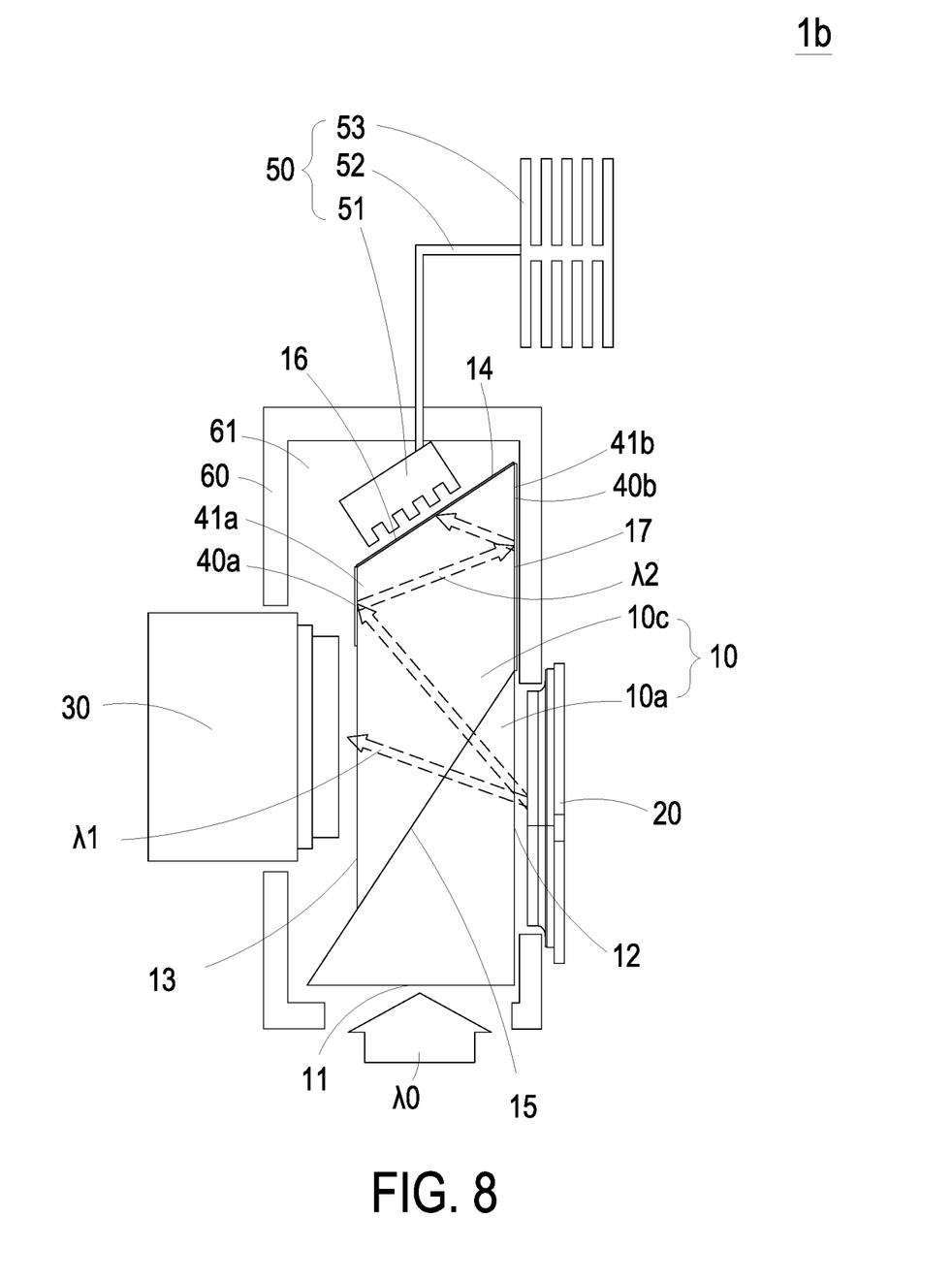
FIG. 8 is a structural view illustrating a projection device according to a third embodiment of the present disclosure.
Figure 9:
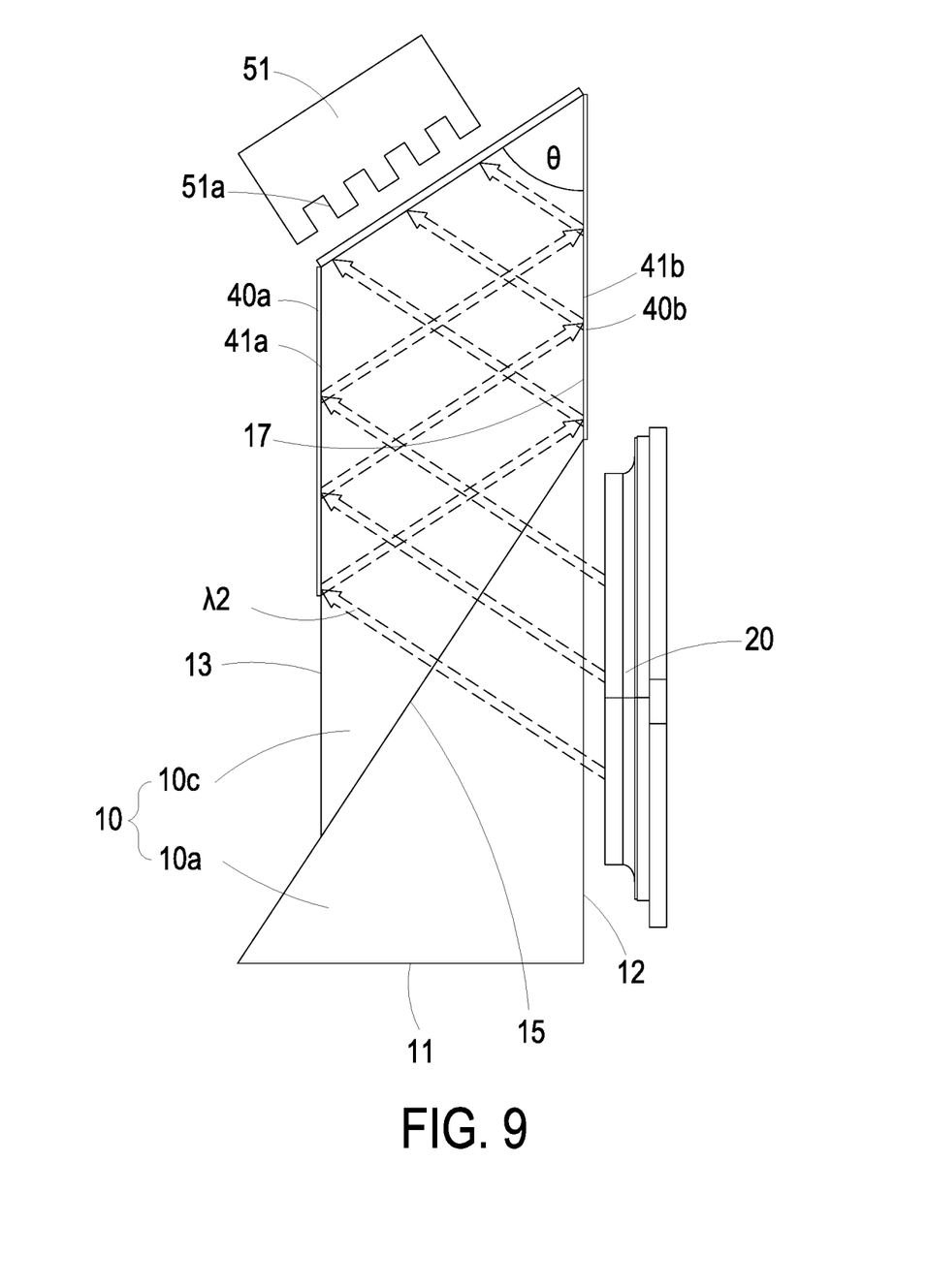
FIG. 9 is a light path diagram of an off-state light of the projection device according to the third embodiment of the present disclosure.

FIG. 8 is a structural view illustrating a projection device according to a third embodiment of the present disclosure. FIG. 9 is a light path diagram of an off-state light of the projection device according to the third embodiment of the present disclosure. In the embodiment, the structures, elements and functions of the projection device 1b are similar to those of the projection device 1 in FIGS. 1 to 5. The elements and features indicated by the numerals similar to those of the first embodiment mean similar elements and features, and are not redundantly described herein. In the embodiment, the projection device 1b further includes a reflective component 40a and an auxiliary reflective component 40b. The prism set 10 includes a first prism 10a and a second prism 10c. The first prism 10a and the second prism 10c have an interface 15, which is configured to reflect the incident light λ0 toward the digital micro-mirror device 20. In the embodiment, the first prism 10a includes a light-incident side 11 and a mirror-corresponding side 12. The second prism 10b includes a first light-emitting side 13, a second light-emitting side 14 and an auxiliary reflective side 17. The first light-emitting side 13 and the auxiliary reflective side 17 are opposite to each other. The second light-emitting side 14 is connected between the first light-emitting side 13 and the auxiliary reflective side 17. Preferably but not exclusively, an angle θ is formed between the auxiliary reflective side 17 and the second light-emitting side 14. The angle θ is less than 90 degrees. In the embodiment, the reflective component 40a and the auxiliary reflective component 40c are for example but not limited a reflection film, respectively, formed on the first light-emitting side 13 and the auxiliary reflective side 17. In another embodiment, the reflective component 40a and the auxiliary reflective component 40c are for example but not limited a metallic sheet, respectively, spatially corresponding to the first light-emitting side 13 and the auxiliary reflective side 17. The present disclosure is not limited thereto. When the digital micro-mirror device 20 generates the off-state light λ2, the off-state light λ2 is transmitted through the interface 15 to the reflective component 40a, the reflective surface 41a of the reflective component 40a reflects the off-state light λ2 to the auxiliary reflective side 17, the reflective surface 41b of the auxiliary reflective component 40b further reflects the off-state light λ2 to the second light-emitting side 14, and the off-state light λ2 passes through the anti-reflection film 16 on the second light-emitting side 14. The off-state light λ2 passing through the anti-reflection film 16 on the second light-emitting side 14 is absorbed by the receiving portion 51 of the heat dissipation module 50, which is accommodated within the casing 60, so that the off-state light λ2 is converted into heat energy. After the off-state light λ2 is converted into the heat energy, the heat energy is transferred through the thermal conducting portion 52 to the heat dissipation portion 53 located outside the casing 60 for heat dissipation. Notably, the reflective component 40a and the auxiliary reflective component 40c spatially correspond to the first light-emitting side 13 of the first prism 10a and the auxiliary reflective side 17 of the second prism 10c, respectively, and the receiving portion 51 of the heat dissipation module 50 spatially corresponds to the second light-emitting side 14 of the second prism 10c and is accommodated within the accommodation space 61 of the casing 60. It solves the problem that it is difficult to directly dissipate the energy of the off-state light λ2 when the available space is limited. It is beneficial to achieve the heat dissipation effect in the closed optical mechanism, such as in the casing 60, and decrease the temperature of the internal critical optical components. Thus, the luminous efficiency and the reliability of the projection device 1b are enhanced. It should be further noted that the design of the prism set 10 is adjustable according to the practical requirements. With the arrangement of the auxiliary reflective component 40c, the receiving portion 51 of the heat dissipation module 50 and the prism set 10 are optimally accommodated in the accommodation space 61 of the casing 60, and the accommodation space 61 of the casing 60 is effectively utilized. Certainly, the types of the first prism 10a and the second prism 10c, the number and the arrangement of the auxiliary reflective component 40c are adjustable according to the practical requirements. The present disclosure is not limited thereto, and not redundantly described hereafter.

In summary, the present disclosure provides a projection device having a heat dissipation module for an off-state light. By disposing at least one reflective component and a heat dissipation module spatially corresponding to a first light-emitting side and a second light-emitting side of the prism set, respectively, it solves the problem that it is difficult to directly dissipate the energy of the off-state light when the available space is limited. It is beneficial to achieve the heat dissipation effect in the closed optical mechanism and decrease the temperature of the internal critical optical components. Thus, the luminous efficiency and the reliability of the projection device are enhanced. In addition, with the arrangement of the reflective component, the off-state light is transmitted to a space conducive to heat dissipation and a heat dissipation module is further utilized for heat dissipation. An anti-reflection film is formed on the second light-emitting side where the off-state light passes through, so as to increase the transmittance of the off-state light passing thought the second light-emitting side and reduce the stagnation of the off-state light in the prism set. On the other hand, a receiving portion of the heat dissipation module is disposed adjacent to the second light-emitting side of the prism set and accommodated within the closed optical mechanism for absorbing the off-state light and converting the off-state light into heat energy. The heat energy converted from the off-state light is further transferred to an external heat dissipation portion by a thermal conducting portion for heat dissipation. The receiving portion is located at the inside of the optical mechanism and includes a geometric surface that is conducive to the retention of the off-state light for absorption. Moreover, the geometric surface is blackened and roughened to increase the absorption of the off-state light. The light energy of the off-state light is absorbed and converted into the heat energy by the receiving portion efficiently. The heat energy is transferred through the thermal conducting portion to the heat dissipation portion located outside the optical mechanism for heat dissipation. The problem of disposing the heat dissipation module is solved. Moreover, it is beneficial to achieve the heat dissipation effect to release the energy of the off-state light inside the optical mechanism and decrease the temperature of the internal critical optical components. Thus, the luminous efficiency and the reliability of the projection device are enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection device comprising:
   a prism set comprising a light-incident side, a mirror-corresponding side, a first light-emitting side and a second light-emitting side, wherein the mirror-corresponding side and the first light-emitting side are opposite to each other, the first light-emitting side and the second light-emitting side are disposed adjacent to each other, and an anti-reflection film is disposed on the second light-emitting side;
   a digital micro-mirror device spatially corresponding to the mirror-corresponding side of the prism set, wherein when an incident light passes through the light-incident side of the prism set and is transmitted to the digital micro-mirror device, the digital micro-mirror device is configured to generate one of an on-state light and an off-state light selectively;
   a lens spatially corresponding to the first light-emitting side of the prism set, wherein when the digital micro-mirror device generates the on-state light, the on-state light passes through the first light-emitting side and is transmitted to the lens;
   a reflective component disposed between the prism set and the lens and at least partially overlapping the first light-emitting side in view of a direction from the prism set toward the lens, wherein when the digital micro-mirror device generates the off-state light, the off-state light passes through the first light-emitting side and is transmitted to the reflective component, the reflective component reflects the off-state light, and the off-state light passes through the first light-emitting side and through the anti-reflection film on the second light-emitting side; and
   a heat dissipation module spatially corresponding to the first light-emitting side and the second light-emitting side of the prism set, wherein the off-state light reflected from the reflective component and passing through the anti-reflection film on the second light-emitting side is absorbed by the heat dissipation module and converted into heat energy for heat dissipation.

2. The projection device according to claim 1, wherein the heat dissipation module comprises a receiving portion disposed adjacent to the second light-emitting side of the prism set and configured to absorb the off-state light passing through the anti-reflection film on the second light-emitting side.

3. The projection device according to claim 2, wherein the receiving portion comprises a geometric surface, wherein the geometric surface is blackened and roughened to facilitate retention of the off-state light and increase absorption of the off-state light.

4. The projection device according to claim 2, further comprising a casing having an accommodation space, wherein the prism set and the receiving portion of the heat dissipation module are accommodated within the accommodation space, the incident light faces the light-incident side, the digital micro-mirror device faces the mirror-corresponding side, and the lens faces the first light-emitting side.

5. The projection device according to claim 4, wherein the heat dissipation module further comprises a thermal conducting portion and a heat dissipation portion, wherein the thermal conducting portion is connected between the receiving portion and the heat dissipation portion, and the heat dissipation portion is disposed outside the casing.

6. The projection device according to claim 1, wherein an angle is formed between the first light-emitting side and the second light-emitting side, wherein the angle is less than 90 degrees.

7. The projection device according to claim 1, wherein the prism set further comprises an auxiliary reflective side, wherein the first light-emitting side and the auxiliary reflective side face each other, and the second light-emitting side is connected between the first light-emitting side and the auxiliary reflective side.

8. The projection device according to claim 7, wherein an angle is formed between the second light-emitting side and the auxiliary reflective side, wherein the angle is less than 90 degrees.

9. The projection device according to claim 1, wherein the prism set comprises at least one first prism and at least one second prism, wherein the at least one first prism and the at least one second prism have an interface, which is configured to reflect the incident light toward the digital micro-mirror device and allows the on-state light and the off-state light to pass therethrough, wherein the light-incident side and the mirror-corresponding side are disposed on the at least one first prism, and the first light-emitting side and the second light-emitting side are disposed on the at least one second prism.

10. The projection device according to claim 1, wherein the reflective component is a reflection film disposed on the first light-emitting side, and the reflection film at least partially covers the first light-emitting side.

11. The projection device according to claim 1, wherein the reflective component is a metallic sheet has a reflective surface, wherein the reflective surface at least partially overlaps the first light-emitting side in view of the direction from the prism set toward the lens.

12. The projection device according to claim 1, wherein the projection device is a one-chip laser projector.

13. A projection device comprising:
   a prism set comprising a light-incident side, a mirror-corresponding side, a first light-emitting side and a second light-emitting side, wherein the mirror-corresponding side and the first light-emitting side are opposite to each other, and the first light-emitting side and the second light-emitting side are disposed adjacent to each other;
   a digital micro-mirror device spatially corresponding to the mirror-corresponding side of the prism set, wherein when an incident light passes through the light-incident side of the prism set and is transmitted to the digital micro-mirror device, the digital micro-mirror device is configured to generate one of an on-state light and an off-state light selectively, wherein when the digital micro-mirror device generates the on-state light, the on-state light passes through the first light-emitting side;
   a reflective component spatially corresponding to the first light-emitting side of the prism set and at least partially overlapping the first light-emitting side in view of a direction of the on-state light passing through the first light-emitting side, wherein when the digital micro-mirror device generates the off-state light, the off-state light passes through the first light-emitting side and is transmitted to the reflective component, the reflective component reflects the off-state light, and the off-state light passes through the first light-emitting side and through the second light-emitting side; and a heat dissipation module spatially corresponding to the first light-emitting side and the second light-emitting side of the prism set, wherein the off-state light reflected from the reflective component and passing through the second light-emitting side is absorbed by the heat dissipation module and converted into heat energy for heat dissipation.

14. The projection device according to claim 13, further comprising a lens spatially corresponding to the first light-emitting side of the prism set, wherein when the digital micro-mirror device generates the on-state light, the on-state light passes through the first light-emitting side and is transmitted to the lens.

15. The projection device according to the claim 14, wherein an anti-reflection film is formed on the second light-emitting side.

16. The projection device according to claim 15, wherein the heat dissipation module comprises a receiving portion, a thermal conducting portion and a heat dissipation portion, wherein the receiving portion is disposed adjacent to the second light-emitting side of the prism set and configured to absorb the off-state light passing through the anti-reflection film on the second light-emitting side, wherein the thermal conducting portion is connected between the receiving portion and the heat dissipation portion.

17. The projection device according to claim 16, wherein the receiving portion comprises a geometric surface, wherein the geometric surface is blackened and roughened to facilitate retention of the off-state light and increase absorption of the off-state light.

18. The projection device according to claim 16, further comprising a casing having an accommodation space, wherein the prism set and the receiving portion of the heat dissipation module are accommodated within the accommodation space, the incident light faces the light-incident side, the digital micro-mirror device faces the mirror-corresponding side, the lens faces the first light-emitting side, and the heat dissipation portion is disposed outside the casing.

19. The projection device according to claim 14, wherein the reflective component is a metallic sheet has a reflective surface, wherein the reflective surface at least partially overlaps the first light-emitting side in view of the direction from the prism set toward the lens.

20. The projection device according to claim 13, wherein an angle is formed between the first light-emitting side and the second light-emitting side, wherein the angle is less than 90 degrees.

21. The projection device according to claim 13, wherein the prism set further comprises an auxiliary reflective side, wherein the first light-emitting side and the auxiliary reflective side face each other, and the second light-emitting side is connected between the first light-emitting side and the auxiliary reflective side.

22. The projection device according to claim 21, wherein an angle is formed between the second light-emitting side and the auxiliary reflective side, wherein the angle is less than 90 degrees.

23. The projection device according to claim 13, wherein the prism set comprises at least one first prism and at least one second prism, wherein the at least one first prism and the at least one second prism have an interface, which is configured to reflect the incident light toward the digital micro-mirror device and allows the on-state light and the off-state light to pass therethrough, wherein the light-incident side and the mirror-corresponding side are disposed on the at least one first prism, and the first light-emitting side and the second light-emitting side are disposed on the at least one second prism.

24. The projection device according to claim 13, wherein the reflective component is a reflection film disposed on the first light-emitting side, and the reflection film at least partially covers the first light-emitting side.

* * * * *